United States Patent
Xie et al.

(10) Patent No.: US 9,504,078 B1
(45) Date of Patent: Nov. 22, 2016

(54) METHOD OF COMMUNICATION AND APPARATUS OF COMMUNICATION BETWEEN DEVICES

(71) Applicant: LEAUTO INTELLIGENT TECHNOLOGY (BEIJING) CO. LTD, Chaoyang District Beijing (CN)

(72) Inventors: Lingfei Xie, Chaoyang District Beijing (CN); Mujin Wang, Chaoyang District Beijing (CN)

(73) Assignee: Leauto Intelligent Technology (BEIJING) Co., Ltd., Chaoyang District Beijing (CN)

( * ) Notice: Subject to any disclaimer, the term of this patent is extended or adjusted under 35 U.S.C. 154(b) by 0 days.

(21) Appl. No.: 14/978,807

(22) Filed: Dec. 22, 2015

(30) Foreign Application Priority Data

Oct. 30, 2015 (CN) .......................... 2015 1 07276799

(51) Int. Cl.
*H04W 76/02* (2009.01)
*H04W 4/14* (2009.01)
*H04M 3/02* (2006.01)

(52) U.S. Cl.
CPC ............. *H04W 76/023* (2013.01); *H04M 3/02* (2013.01); *H04W 4/14* (2013.01)

(58) Field of Classification Search
CPC ...... H04W 76/023; H04W 4/14; H04M 3/02
See application file for complete search history.

(56) References Cited

U.S. PATENT DOCUMENTS

| | | | | |
|---|---|---|---|---|
| 8,644,158 B2 * | 2/2014 | Ni | ........................ | H04L 12/5691 370/235 |
| 2008/0107051 A1 * | 5/2008 | Chen | ..................... | H04W 48/18 370/310 |
| 2013/0005377 A1 * | 1/2013 | Wang | ................. | H04W 72/0406 455/509 |
| 2013/0288654 A1 * | 10/2013 | Jeon | ........................ | H04W 4/16 455/417 |
| 2015/0271813 A1 * | 9/2015 | Kim | ..................... | H04L 5/0092 370/329 |
| 2016/0029248 A1 * | 1/2016 | Syed | ..................... | H04W 28/08 370/235 |

* cited by examiner

*Primary Examiner* — Brandon Miller
(74) *Attorney, Agent, or Firm* — Nixon Peabody LLP; Jeffrey L. Costellia (57) ABSTRACT

This present disclosure discloses a method and an apparatus of communication between devices, the method being implemented at the wireless access equipment side and including: establishing connection with a first device; acquiring communication instructions sent by the first device; selecting for communication, as appropriate to the communication instruction, a client identification module from at least one client identification module in the wireless access equipment; establishing connection with a second device via the client identification module selected for communication so as to enable communication between the first device and the second device. This proposal provides the user with a backup communication means, whereby the user may use the first device to communicate with the second device conveniently via the wireless access equipment when the mobile phone signal becomes unreliable, the mobile phone is out of power, or the mobile phone is not with the user.

12 Claims, 5 Drawing Sheets

METHOD OF COMMUNICATION AND APPARATUS OF COMMUNICATION BETWEEN DEVICES

CROSS-REFERENCE TO RELATED APPLICATIONS

This application is based upon and claims priority to Chinese Patent Application 201510727679.9, titled "Method of Communication and Apparatus of Communication between Devices", filed 30 Oct. 2015, the entire contents of which are incorporated herein by reference.

FIELD OF TECHNOLOGY

The present disclosure relates to the Internet technology field, and more particularly, to a method of communication and an apparatus of communication between devices.

BACKGROUND

Along with the gradual progress of the living standard, mobile phones are universally used and become one of the necessaries of life for most people, and communication via mobile phone becomes a major means of communication among people. For example, people grow accustomed to keeping contact with relatives, friends, colleagues, and work fellows, etc. by means of mobile phones.

Under some extreme circumstances, however, like unstable mobile phone signal, low power of mobile phones, or the mobile phone not being carried about, people are unable to communicate normally via their phone, hence experiencing great inconveniences; but prior art does not provide for any good backup means of communication to cope with these circumstances.

SUMMARY

Given the above-related problems, the present disclosure is proposed with the objective of providing a method of communication and an apparatus of communication between devices that are capable of solving, or at least partially solving, the above-related problems.

According to one aspect of the present disclosure, there is provided a method of communication between devices, the method being implemented at a wireless access equipment side and including:
 establishing connection with a first device;
 acquiring communication instructions sent by the first device;
 selecting for communication, as appropriate to the communication instruction, a client identification module from at least one client identification module in the wireless access equipment; and
 establishing connection with a second device via the client identification module selected for communication so as to enable communication between the first device and the second device.

Further, establishing connection with a first device further includes: establishing connection with the first device via wireless signal emitted by the wireless access equipment.

Further, communication instructions include call-establishing instructions, message-sending instructions, and message-acquiring instructions.

Further, selecting for communication, as appropriate to the communication instruction, a client identification module from at least one client identification module in the wireless access equipment further includes:
 judging whether the communication instruction is a call-establishing instruction; if yes, a client identification module being selected for communication, as appropriate to the call-establishing instruction, from at least one client identification module in the wireless access equipment; if not, it being judged whether the communication instruction is a message-sending instruction;
 if it is judged that the communication instruction is a message-sending instruction, a client identification module being selected for communication, as appropriate to the message-sending instruction, from at least one client identification module in the wireless access equipment; if it is judged that the communication instruction is not a message-sending instruction, it being then judged whether the communication instruction is a message-acquiring instruction;
 if the communication instruction is judged to be a message-acquiring instruction, a client identification module being selected for communication, as appropriate to the message-acquiring instruction, from at least one client identification module in the wireless access equipment.

Further, when the communication instruction is a call-establishing instruction, establishing connection with a second device via the client identification module selected for communication so as to enable communication between the first device and the second device further includes:
 establishing connection with the client identification module selected for communication;
 sending to the first device an instruction for turning on its speaker and microphone;
 from the feedback by the first device in response to the instruction for turning on the speaker and the microphone, establishing connection with the second device via the client identification module selected for communication so as to enable calling between the first device and the second device.

Further, when the communication instruction is a message-sending instruction, establishing connection with the second device via the client identification module selected for communication so as to enable communication between the first device and the second device further includes:
 establishing connection with the client identification module selected for communication;
 acquiring a to-be-sent message sent by the first device;
 sending to the second device the to-be-sent message in the format of SMS or MMS as appropriate to the to-be-sent message.

Further, when the communication instruction is a message-acquiring instruction, establishing connection with the second device via the client identification module selected for communication so as to enable communication between the first device and the second device further includes:
 establishing connection with the client identification module selected for communication;
 establishing connection with the second device, with which a binding relation is created, via the client identification module selected for communication;
 acquiring a message in the second device, with which a binding relation is created;
 sending the message to the first device.

Further, after the step of sending to the second device the to-be-sent message in the format of SMS or MMS as appropriate to the to-be-sent message, this method further includes: feeding a sending result back to the first device.

According to another aspect of the present disclosure, there is provided a communication apparatus, the apparatus includes:
one or more processors; and
a memory;
one or more programs, wherein one or more programs are stored in the memory, and when executed by the one or more processors, the one or more programs cause the one or more processors to perform:
establishing connection with a first device;
acquiring communication instructions sent by the first device;
selecting for communication, as appropriate to the communication instruction, a client identification module from at least one client identification module in the wireless access equipment; and
establishing connection with a second device via the client identification module selected for communication so as to enable communication between the first device and the second device.

Further, the one or more processors are further configured to perform: establishing connection with the first device via wireless signal emitted by the wireless access equipment.

Further, the communication instructions include call-establishing instructions, message-sending instructions, and message-acquiring instructions.

Further, the one or more processors are further configured to perform:
judging whether the communication instruction is a call-establishing instruction; if yes, then, as appropriate to the call-establishing instruction, a client identification module being selected for communication from at least one client identification module in the wireless access equipment; if not, it being judged whether the communication instruction is a message-sending instruction;
if it is judged that the communication instruction is a message-sending instruction, a client identification module being then selected for communication, as appropriate to the message-sending instruction, from at least one client identification module in the wireless access equipment; if it is judged that the communication instruction is not a message-sending instruction, it being then judged whether the communication instruction is a message-acquiring instruction;
if the communication instruction is judged to be a message-acquiring instruction, a client identification module being then selected for communication, as appropriate to the message-acquiring instruction, from at least one client identification module in the wireless access equipment.

Further, the one or more processors are further configured to perform:
when the communication instruction is a call-establishing instruction, establishing connection with the client identification module selected for communication;
sending to the first device an instruction for turning on its speaker and microphone;
from the feedback by the first device in response to the instruction for turning on the speaker and the microphone, establishing connection with the second device via the client identification module selected for communication so as to enable calling between the first device and the second device.

Further, the one or more processors are further configured to perform:
when the communication instruction is a message-sending instruction, establishing connection with the client identification module selected for communication;
acquiring a to-be-sent message sent by the first device;
sending to the second device the to-be-sent message in the format of SMS or MMS as appropriate to the to-be-sent message.

Further, the one or more processors are further configured to perform:
when the communication instruction is a message-acquiring instruction, establishing connection with the client identification module selected for communication;
establishing connection with the second device, with which a binding relation is created, via the client identification module selected for communication;
acquiring a message in the second device, with which a binding relation is created;
sending the message to the first device.

Further, the one or more processors are further configured to perform: feeding a sending result back to the first device.

According to the technical proposal of the present disclosure, connection is firstly established with a first device and the communication instruction from the first device is acquired, and then, as appropriate to the communication instruction, a client identification module is selected for communication from at least one client identification module in the wireless access equipment, and finally connection with a second device is established via the client identification module selected for communication so as to enable communication between the first device and the second device. The technical proposal provided by the present disclosure provides the user with a backup communication means, whereby the user may use the first device to communicate with the second device conveniently via the wireless access equipment when the mobile phone signal becomes unreliable, the mobile phone is out of power, or the mobile phone is not with the user.

The above illustration is only a general description of the technical solutions provided by the present disclosure, aiming at making the technical means of the present disclosure understood more clearly and thereby practiced based on the contents of the specification. Further, in order to make the above and other objects, features and advantages of the present disclosure more obvious, specific implementations of the present disclosure will be exemplified below.

BRIEF DESCRIPTION OF THE DRAWINGS

One of ordinary skill in this art will appreciate other advantages from the following detailed description of exemplary embodiments herein. Drawings are only for showing exemplary embodiments but not for limiting the scope of the present disclosure. Through the drawings, similar reference numbers represent similar elements. Of the drawings.

DESCRIPTION OF THE EMBODIMENTS

Exemplary embodiments of the present disclosure will be described below in detail with reference to drawings. Even though exemplary embodiments of the present disclosure are presented in drawings, it shall be appreciated that the present disclosure may be practiced in various manners without being limited to the embodiments set forth herein. Instead, the embodiments are provided herein to make the present disclosure be understood more thoroughly and to more completely convey the scope of the present disclosure to one of ordinary skill in this art.

To enable and maintain convenient communication with other mobile phones when the mobile phone signal is not reliable, the mobile phone is out of power, the mobile phone is not around, or under other extreme circumstances, the present disclosure provides a method of communication between devices. According to the technical proposal of the present disclosure, a first device is able to communicate with a second device via wireless access equipment. Where, the first device can be a mobile phone, PAD, or computer, etc., the second device can be a mobile phone, and the wireless access equipment is a piece of wireless access equipment including at least one client identification module, for example a router. The wireless access equipment supports the client identification modules of at least one carrier. Where, the client identification modules can be, for example, SIM cards, and in particular, the client identification modules can be network cards or data cards, etc., wherein the network cards provide network accessing service, the data cards not only provide network accessing service but also provide voice call service, etc. With prior art, major carriers are China Mobile, China Unicom, and China Telecom; therefore, the client identification modules can be China Mobile SIM cards, China Unicom SIM cards, or China Telecom SIM cards.

Figure 1:
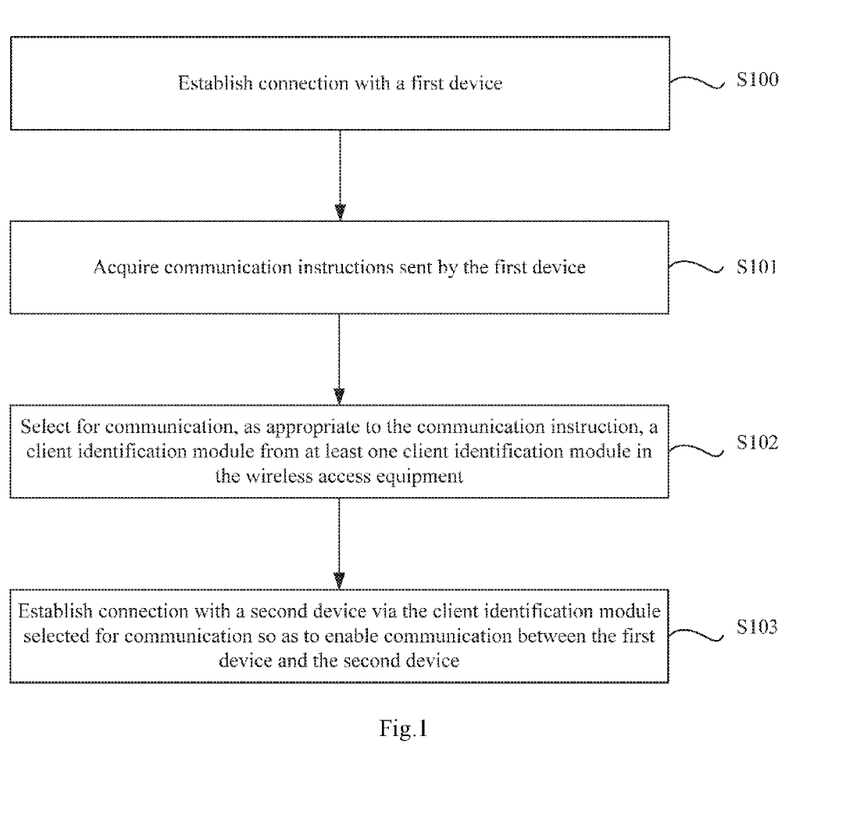
FIG. 1 is a schematic process flow chart for the method of communication between devices according to an embodiment of the present disclosure.

FIG. 1 illustrates a schematic process flow chart for the method of communication between devices according to an embodiment of the present disclosure, this method being implemented at the wireless access equipment side, as shown in FIG. 1, and this method including the following steps:

Step S100: establishing connection with a first device.

Step S101: acquiring communication instructions sent by the first device.

Where, communication instructions include call-establishing instructions, message-sending instructions, and message-acquiring instructions. The first device contains an application program that controls the wireless access equipment. After connection is established between the wireless access equipment and the first device, the first device can send communication instructions via the application program to the wireless access equipment, and the wireless access equipment acquires communication instructions sent by the first device.

Step S102: selecting for communication, as appropriate to the communication instruction, a client identification module from at least one client identification module in the wireless access equipment.

As appropriate to the communication instruction acquired in Step S101, a client identification module is selected for communication from at least one client identification module in the wireless access equipment.

Step S103: establishing connection with a second device via the client identification module selected for communication so as to enable communication between the first device and the second device.

In Step S103, connection with the second device may be established via the client identification module selected for communication in Step S102 so as to enable communication between the first device and the second device.

The method of communication between devices provided according to the embodiment is implemented at the wireless access equipment side, whereby connection is firstly established with a first device to acquire a communication instruction from the first device, then, as appropriate to the communication instruction, a client identification module is selected for communication from at least one client identification module in the wireless access equipment, and finally connection is established with a second device via the client identification module selected for communication so as to enable communication between the first device and the second device. The technical proposal provided by the present disclosure provides the user with a backup communication means, whereby the user may use the first device to communicate with the second device conveniently via the wireless access equipment when the mobile phone signal becomes unreliable, the mobile phone is out of power, or the mobile phone is not with the user.

Figure 2:
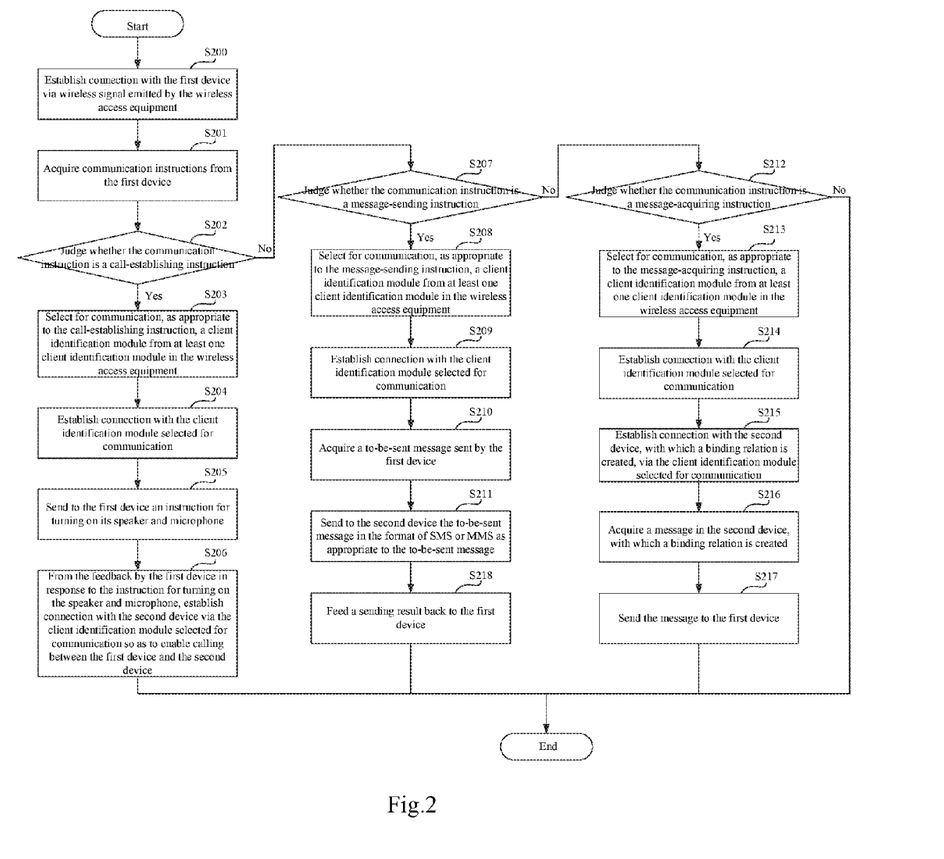
FIG. 2 is a schematic process flow chart for the method of communication between devices according to another embodiment of the present disclosure.

FIG. 2 illustrates a schematic process flow chart for the method of communication between devices according to another embodiment of the present disclosure, this method being implemented at the wireless access equipment side, as shown in FIG. 2, and this method including the following steps:

Step S200: establishing connection with the first device via wireless signal emitted by the wireless access equipment.

For instance, the wireless access equipment includes three client identification modules, the three client identification modules being the first client identification module, the second client identification module, and the third client identification module respectively. The wireless access equipment can emit wireless signal via any client identification module. With the wireless access signal, the wireless access equipment is able to establish connection with the first device.

Step S201: acquiring communication instructions from the first device.

Where, communication instructions include call-establishing instructions, message-sending instructions, and message-acquiring instructions. The first device contains an application program that controls the wireless access equipment. After connection is established between the wireless access equipment and the first device, the user may use the first device to send communication instructions via the application program to the wireless access equipment, and then the wireless access equipment acquires the communication instructions sent by the first device.

Step S202: judging whether the communication instruction is a call-establishing instruction; if yes, then proceed to Step S203; if not, then proceed to Step S207.

Step S203: selecting for communication, as appropriate to the call-establishing instruction, a client identification module from at least one client identification module in the wireless access equipment.

Step S204: establishing connection with the client identification module selected for communication.

Step S205: sending to the first device an instruction for turning on its speaker and microphone.

Step S206: from the feedback by the first device in response to the instruction for turning on the speaker and microphone, establishing connection with the second device via the client identification module selected for communication so as to enable calling between the first device and the second device.

For instance, the wireless access equipment includes a first client identification module, a second client identification module, and a third client identification module; where, the carrier of the first client identification module is China Mobile, the carrier of the second client identification module is China Unicom, and the carrier of the third client identification module is China Telecom. In the user's region the signal of China Mobile is good but that of China Unicom and China Telecom is poor because of the base station layout and signal access factors, resulting in good signal status of the first client identification module but poor signal status of the second client identification module and the third client identification module. Assuming the user's mobile phone carrier is also China Telecom, that is the user's mobile phone signal is also poor, but the user desires to call others and under such a circumstance the user may use PAD device etc. (namely the first device) to establish calling with another person's mobile phone (namely the second device) via the first client identification module, whose signal status is good, in the wireless access equipment.

In particular, if the communication instruction is judged in Step S202 to be a call-establishing instruction, then Step S203 is performed. Assuming that the call-establishing instruction is, in particular, for establishing a call with the second device via the first client identification module, then Step S203 is performed, the client identification module selected for communication, as appropriate to the call-establishing instruction, is the first client identification module, and then Step S204 and Step S205 are performed one after the other to establish connection with the first client identification module and to send an instruction to the first device for turning on the speaker and the microphone. After the first device acquires the instruction for turning on the speaker and the microphone, the first device can display to the user a prompt message for turning on the speaker and the microphone, the user operates as instructed by the prompting message, for example turning on the speaker and the microphone, then the first device, as appropriate to the user's operation, feeds back to the wireless access equipment, and in Step S206, as appropriate to the first device's feedback in response to the instruction for turning on the speaker and the microphone, connection is established with the second device via the first client identification module so as to enable calling between the first device and the second device.

Besides, when the user wants to use the first device to have a call with the second device via the wireless access equipment, the first device shall have a speaker and a microphone, otherwise when a call is established between the second device the user can neither acquire the call information from the second device by using the first device nor send call information to the second device via the first device.

Step S207: judging whether the communication instruction is a message-sending instruction; if yes, then proceed to Step S208; if not, then proceed to Step S212.

Step S208: selecting for communication, as appropriate to the message-sending instruction, a client identification module from at least one client identification module in the wireless access equipment.

Step S209: establishing connection with the client identification module selected for communication.

Step S210: acquiring a to-be-sent message sent by the first device.

Step S211: sending to the second device the to-be-sent message in the format of SMS or MMS as appropriate to the to-be-sent message.

The method may also include, after Step S211, a Step S218, feeding a sending result back to the first device. So the user may know, from the fed back sending results, whether the SMS or MMS has been sent successfully to the second device.

For instance, if the communication instruction is judged in Step S207 to be a message-sending instruction, then Step S208 is performed. Assuming that the message-sending instruction is, in particular, for sending a message to the second device via the second client identification module, then Step S208 is performed, the client identification module selected for communication, as appropriate to the message-sending instruction, is the second client identification module, and then Step S209 through Step S211 are performed one after another to establish connection with the second client identification module, to acquire the to-be-sent message sent by the first device, and to send the message to the second device in the format of SMS or MMS as appropriate to the to-be-sent message. In particular, when the to-be-sent massage is a text message, the message is sent to the second device in the format of SMS; when the to-be-sent massage is a voice or image message, the message is sent to the second device in the format of MMS.

Step S212: judging whether the communication instruction is a message-acquiring instruction; if yes, then proceed to Step S213; if not, then end this method.

Step S213: selecting for communication, as appropriate to the message-acquiring instruction, a client identification module from at least one client identification module in the wireless access equipment.

Step S214: establishing connection with the client identification module selected for communication.

Step S215: establishing connection with the second device, with which a binding relation is created, via the client identification module selected for communication.

Step S216: acquiring a message in the second device, with which a binding relation is created.

Step S217: sending the message to the first device.

Assuming the user does not carry a phone, for example forgetting to carry it about, but desires to acquire the messages in the phone, which has created a binding relation with the wireless access equipment, then the user may use the first device to have communication with the user's phone (i.e., the second device) via the wireless access equipment to acquire the messages in the phone.

In particular, if the communication instruction is judged in Step S212 to be a message-acquiring instruction, then Step S213 is performed. Assuming the message-acquiring instruction is, in particular, for acquiring, via the third client identification module, a message in the second device, which has created a binding relation with the wireless access equipment, then Step S213 is performed and, as appropriate to the message-acquiring instruction, the client identification selected for communication is the third client identification module, and then Step S214 through S217 are performed one after another to establish connection with the third client identification module, to establish, via the third client identification module, connection with the second device, with which a binding relation has been created, to acquire the message in the second device, with which a binding relation has been created, and then to send the message to the first device.

The method of communication between devices provided according to the embodiment is implemented at the wireless access equipment side, whereby connection is firstly established with a first device to acquire a communication instruction from the first device, then as appropriate to the particular communication instruction a client identification module is selected for communication from at least one client identification module in the wireless access equipment, and finally connection is established, via the client identification module selected for communication, with a second device so as to establish calling between the first device and the second device, to send messages to the second device, and to acquire messages in the second device, with which a binding relation has been created. The technical proposal provided by the present disclosure provides the user with a backup communication means, whereby when the mobile phone signal becomes unreliable, the mobile phone is out of power, or the mobile phone is not around the user may use the first device to conveniently communicate with the second device, send messages to the second device, and acquire, via the wireless access equipment, messages in second device, with which a binding relation has been created.

Figure 3:
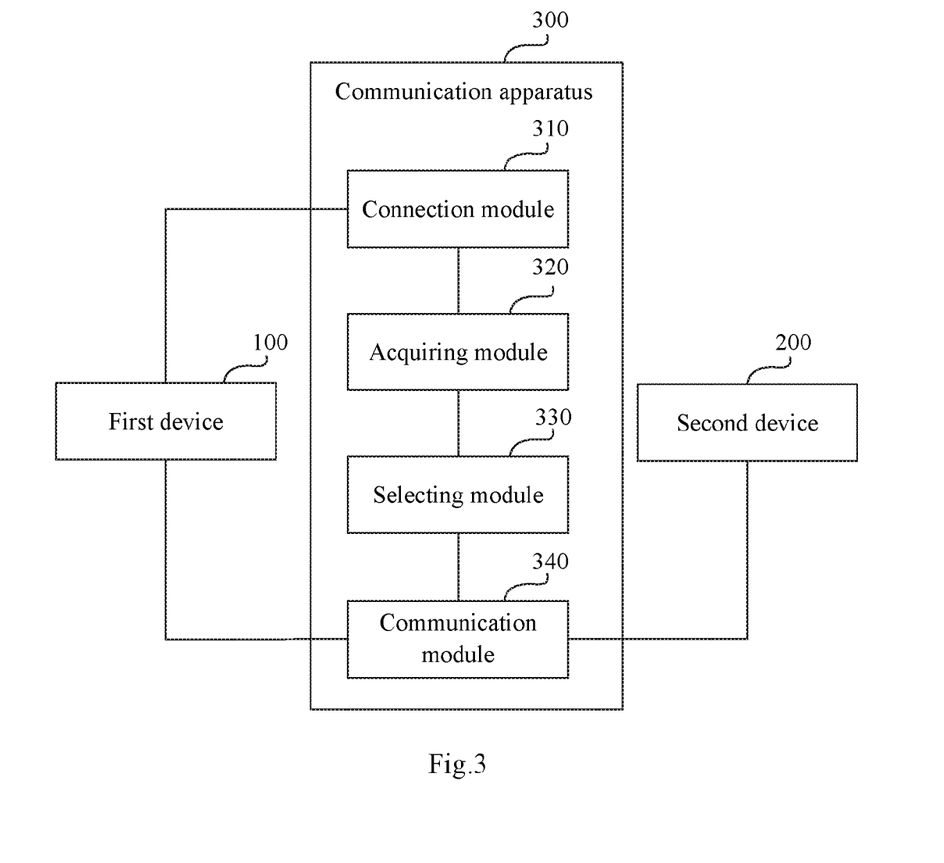
FIG. 3 is a schematic connection block diagram for the connection among the communication apparatus, the first device, and the second device according to an embodiment of the present disclosure.

FIG. 3 illustrates a schematic connection block diagram for the connection among the communication apparatus, the first device, and the second device according to an embodiment of the present disclosure, the communication apparatus 300 being used for enabling communication between the first device 100 and the second device 200, as shown in FIG. 3, and the communication device 300 including: a connection module 310, an acquiring module 320, a selecting module 330, and a communication module 340.

The connection module 310, configured to establish connection with the first device.

The acquiring module 320, configured to acquire communication instructions sent by the first device.

Where, communication instructions include call-establishing instructions, message-sending instructions, and message-acquiring instructions. After connection is established with the first device 100 via the connection module 310, the user may use the first device 100 to send communication instructions via the application program to the wireless access equipment, and then the acquiring module 320 acquires communication instructions sent by the first device 100.

The selecting module 330, configured to select for communication, as appropriate to the communication instruction, a client identification module from at least one client identification module in the wireless access equipment;

The selecting module 330 selects for communication, as appropriate to the communication instruction acquired by the acquiring module 320, a client identification module from at least one client identification module in the wireless access equipment.

The communication module 340, configured to establish connection with a second device 200 via the client identification module selected for communication so as to enable communication between the first device 100 and the second device 200.

The communication apparatus provided according to this embodiment establishes connection with a first device via a connection module, acquires communication instructions from the first device via an acquiring module, and then selects for communication, via a selection module, a client identification module from at least one client identification module in the wireless access equipment, and finally the communication module establishes, via the client identification module selected for communication, connection with the second device so as to enable communication between the first device and the second device. The technical proposal provided by the present disclosure provides the user with a backup communication means, whereby the user may use the first device to communicate with the second device conveniently via the wireless access equipment when the mobile phone signal becomes unreliable, the mobile phone is out of power, or the mobile phone is not with the user.

Figure 4:
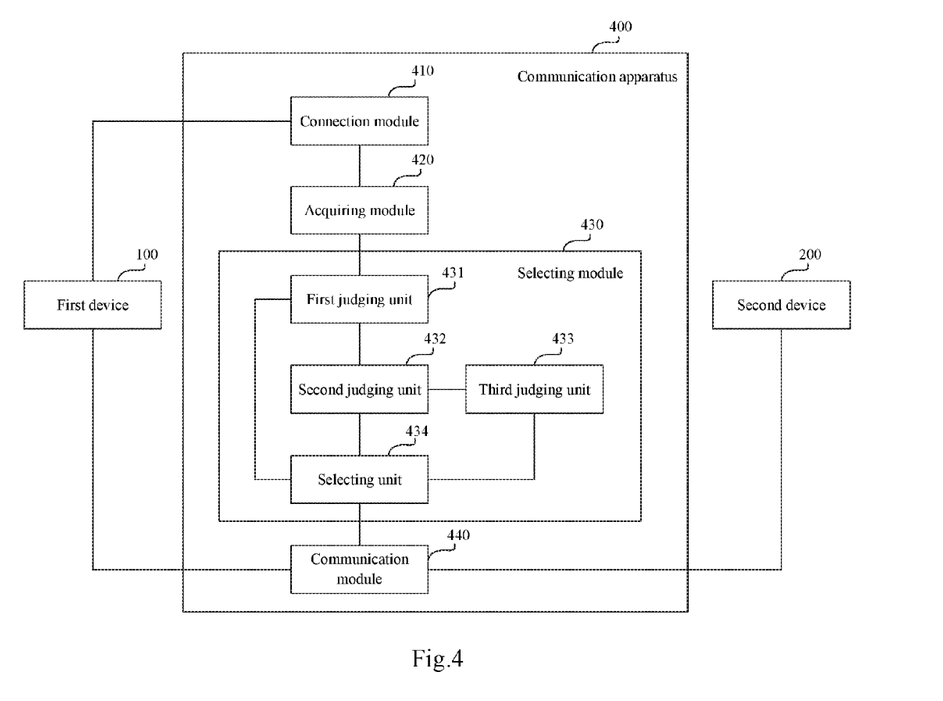
FIG. 4 is a schematic connection block diagram for the connection among the communication apparatus, the first device, and the second device according to another embodiment of the present disclosure.

FIG. 4 illustrates a schematic connection block diagram for the connection among the communication apparatus, the first device, and the second device according to another embodiment of the present disclosure, the communication apparatus 400 being used for enabling communication between the first device 100 and the second device 200, as shown in FIG. 4, and the communication device 400 including: a connection module 410, an acquiring module 420, a selecting module 430, and a communication module 440. Wherein, the selecting module includes: a first judging unit 431, a second judging unit 432, a third judging unit 433, and a selecting unit 434.

The connection module 410, configured to establish connection with the first device 100 via the wireless signal emitted by the wireless access equipment.

The acquiring module 420, configured to acquire communication instructions sent by the first device.

Where, communication instructions include call-establishing instructions, message-sending instructions, and message-acquiring instructions.

The first judging unit 431, configured to judge whether the communication instruction is a call-establishing instruction; if yes, the selecting unit 434 is triggered; if not, the second judging unit 432 is triggered.

The second judging unit 432, configured to judge whether the communication instruction is a message-sending instruction; if yes, the selecting unit 434 is triggered; if not, the third judging unit 433 is triggered.

The third judging unit 433, configured to judge whether the communication instruction is a message-acquiring instruction; if yes, the selecting unit 434 is triggered.

The selecting unit 434, configured to select for communication a client identification module from at least one client identification module in the wireless access equipment.

The communication module 440, configured to establish connection with a second device 200 via the client identification module selected for communication so as to enable communication between the first device 100 and the second device 200.

When the communication instruction is a call-establishing instruction, the communication module 440 is further configured to: establish connection with the client identification module selected for communication; send to the first device 100 an instruction for turning on the speaker and the microphone; as appropriate to the feedback by the first device 100 in response to the instruction for turning on the speaker and the microphone, establish connection with the second device 200 via the client identification module selected for communication so as to enable calling between the first device 100 and the second device 200.

For example, if the first judging unit 431 judges that the communication instruction is a call-establishing instruction, then the selecting unit 434 is triggered. Assuming the call-establishing instruction is, in particular, for establishing a call with the second device 200 via the first client identification module, then the selecting unit 434 selects, as appropriate to the call-establishing instruction, the first client identification module as the client identification module for communication and then triggers the communication module 440 to establish connection with the first client identification module, to send to the first device 100 an instruction for turning on the speaker and the microphone and, as appropriate to the feedback by the first device 100 in response to the instruction for turning on the speaker and the microphone, to establish connection with device 200 via the first client identification module so as to enable calling between the first device 100 and the second device 200.

When the communication instruction is a message-sending instruction, the communication module 440 is further configured to: establish connection with the client identification module selected for communication; acquire a to-be-sent message sent by the first device 100; and send to the second device 200 the to-be-sent message in the format of SMS or MMS as appropriate to the to-be-sent message. The communication module 440 is further configured to: feed a sending result back to the first device 100, so that the user may know, from the fed back sending result, whether the SMS or MMS has been sent successfully to the second device 200.

For example, if the second judging unit 432 judges that the communication instruction is a message-sending instruction, then the selecting unit 434 is triggered. Assuming that the message-sending instruction is, in particular, for sending a message to the second device 200 via the second client identification module, then the selecting unit 434 selects, as appropriate to the message-sending instruction, the second client identification module as the client identification module for communication, and then the communication module 440 is triggered to establish connection with the second client identification module, to acquire the to-be-sent message sent by the first device 100, and to send the message to the second device 200 in the format of SMS or MMS as appropriate to the message. In particular, when the to-be-sent massage is a text message, the message is sent to the second device 200 in the format of SMS; when the to-be-sent massage is a voice or image message, the message is sent to the second device 200 in the format of MMS.

When the communication instruction is a message-acquiring instruction, the communication module 440 is further configured to: establish connection with the client identification module selected for communication; establish connection with the second device 200, with which a binding relation has been created, via the client identification module selected for communication; acquire a message in the second device 200, with which a binding relation has been created; and send the message to the first device 100.

For example, if the third judging unit 433 judges that the communication instruction is a message-acquiring instruction, then the selecting unit 434 is triggered. Assuming the message-acquiring instruction is, in particular, for acquiring, via the third client identification module, a message in the second device 200, which has created a binding relation with the wireless access equipment, then the selecting unit 434 selects, as appropriate to the message-acquiring instruction, the third client identification module as the client identification module for communication, and triggers the communication module 440 to establish communication with the third client identification module, to establish, via the third client identification module, connection with the second device 200, with which a binding relation has been created, to acquire the message in the second device 200, with which a binding relation has been created, and then to send the message to the first device 100.

The communication apparatus provided according to this embodiment establishes connection with a first device via a connection module, acquires communication instructions from the first device via an acquiring module, and then selects for communication, via a selection module, a client identification module from at least one client identification module in the wireless access equipment, and finally the communication module establishes, via the client identification module selected for communication, connection with the second device so as to enable communication between the first device and the second device, sending messages to the second device, and acquiring messages from the second device, with which a binding relation has been created. The technical proposal provided by the present disclosure provides the user with a backup communication means, whereby when the mobile phone signal becomes unreliable, the mobile phone is out of power, or the mobile phone is not around the user may use the first device to conveniently communicate with the second device, send messages to the second device, and acquire, via the wireless access equipment, messages in second device, with which a binding relation has been created.

Figure 5:
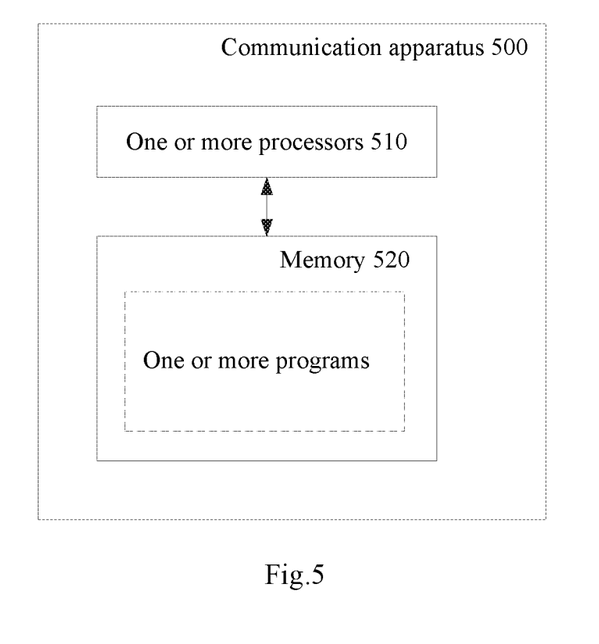
FIG. 5 is a structural block diagram for the communication apparatus according to another embodiment of the present disclosure.

FIG. 5 is a structural block diagram for the communication apparatus according to another embodiment of the present disclosure. The communication apparatus 500 includes: one or more processors 510; and a memory 520; one or more programs, wherein one or more programs are stored in the memory, and when executed by the one or more processors, the one or more programs cause the one or more processors to perform the method provided in the present disclosure.

The algorithms and illustrations given herein are not intrinsically related to any specific computer, virtual system, or other device. Various generic systems may also work with what are instructed and illustrated herein. According to the above description, the structure and components to build such systems are obvious. Moreover, the present disclosure is not limited to any specific programming language. It is understandable that the content of the present disclosure described herein may be realized in various programming languages and the description given above for any particular language is for the purpose of disclosing the optimum embodiment of the present disclosure.

The description given herein illustrates a lot of specific details. However, it is understandable that the embodiments of the present disclosure can be implemented under conditions without such specific details. In some examples, generally known methods, structures, or technologies have not been given specifically in order to avoid blurring the understanding of the description.

Similarly, it shall be understood that in the description of the exemplary embodiments of the present disclosure various characteristics of the present disclosure are sometimes grouped into an individual embodiment, diagram, figure, or description thereof for the sake of simplifying this disclosure and assisting in understanding one or more aspects of the present disclosure. However, the disclosed method should not be interpreted as reflecting the following intent: the present disclosure requested for protection demands more characteristics than the characteristics stated in each individual claim. To be more specific, as reflected in the following claims, the present disclosure aspects are fewer than all the characteristics disclosed above in individual embodiment. Hence, the claim pursuant to a specific embodiment is hereby expressly incorporated into the specific embodiment, wherein each claim per se is treated as an individual embodiment of the present disclosure.

Persons skilled in the art understand and can effect adaptive modification to the modules in the devices described in the embodiments and have them configured in one or more pieces of device other than that described in the embodiments. The modules or units or assemblies in the embodiments can be grouped into one module or unit or assembly, and, more than that, can be divided into multiple submodules or subunits or sub-assemblies. With the exception of at least those that are mutually repulsive among these characteristics and/or processes or units, all the characteristics disclosed in the description (including accompanying claims, abstract, and attached drawings) as well as any methods, or any process or unit of the device disclosed in such a way may be combined in any manner. Unless otherwise expressly stated, every characteristic disclosed in the description (including accompanying claims, abstract, and attached drawings) may be substituted by substitution characteristic that provides identical, equivalent, or similar purpose.

Moreover, persons of skill in the art can understand that although some embodiments illustrated herein include certain characteristics instead of other characteristics contained in other embodiments, the combination of characteristics from different embodiments are still within the scope of the present disclosure and thus form different embodiments. For example, in the following claims any of the embodiments for which protection is requested may be used in any combination.

The embodiments of each component of the present disclosure can be realized using hardware or using software modules running on one or more processors, or be realized by using them in combination. Persons skilled in the art should understand that some or all functions of some or all components according to the embodiments of the present disclosure can be realized in practice using microprocessors or digital signal processors (DSP). The present disclosure can also be realized as device or apparatus programs (e.g., computer program or computer program products) used to execute some or all of the methods described herein. Such realized programs of the present disclosure can be stored on computer readable media or can be in one or more signal forms. Such signals can become available by downloading from the Internet websites or be made available in media signals or in any other form.

It should be noted that the above embodiments provide description of the present disclosure rather than define the limits of the present disclosure, and persons of skill in the art may devise replacement embodiments without departing from the scope of the accompanying claims. In the claims, any reference symbol in brackets shall not constitute any limit to the claims. The word "include" does not rule out any elements or steps not listed in the claims. The word "a", "an", or "one" before an element do not rule out the existence of a plurality of such elements. The present disclosure can be realized by means of hardware consisting of several different elements or by means of appropriately programmed computers. In the unit claims where a number of apparatuses are listed, some of such apparatuses can be implemented in practice using a same hardware item. The word "first", "firstly", "second", "secondly", and "third" or "thirdly", etc., do not connote any sequence or order. Such words may be interpreted as names.

What is claimed is:

1. A method of communication between devices, wherein said method is implemented at a wireless access equipment side and said method comprises:
    establishing connection with a first device;
    acquiring communication instructions sent by said first device, said communication instructions comprise call-establishing instructions, message-sending instructions, and message-acquiring instructions;
    judging whether said communication instruction is a call-establishing instruction; if yes, then, as appropriate to said call-establishing instruction, a client identification module being selected for communication from at least one client identification module in said wireless access equipment if not, it being judged whether said communication instruction is a message-sending instruction;
    if it is judged that said communication instruction is a message-sending instruction, a client identification module being then selected for communication, as appropriate to said message-sending instruction, from said at least one client identification module in said wireless access equipment; if it is judged that said communication instruction is not a message-sending instruction, it being then judged whether said communication instruction is a message-acquiring instruction;
    if said communication instruction is judged to be a message-acquiring instruction, a client identification module being then selected for communication, as appropriate to said message-acquiring instruction, from said at least one client identification module in said wireless access equipment; and
    establishing connection with a second device via the client identification module selected for communication so as to enable communication between said first device and said second device.

2. The method according to claim 1, wherein said establishing connection with a first device further comprises: establishing connection with said first device via wireless signal emitted by said wireless access equipment.

3. The method according to claim 1, wherein when said communication instruction is a call-establishing instruction, said establishing connection with a second device via the client identification module selected for communication so as to enable communication between said first device and said second device further comprises:
    establishing connection with the client identification module selected for communication;
    sending to said first device an instruction for turning on its speaker and microphone;
    from the feedback by said first device in response to said instruction for turning on the speaker and the microphone, establishing connection with said second device via the client identification module selected for communication so as to enable calling between said first device and said second device.

4. The method according to claim 1, wherein when said communication instruction is a message-sending instruction, said establishing connection with a second device via the client identification module selected for communication so as to enable communication between said first device and said second device further comprises:
    establishing connection with the client identification module selected for communication;
    acquiring a to-be-sent message sent by said first device;
    sending to said second device said to-be-sent message in the format of SMS or MMS as appropriate to said to-be-sent message.

5. The method according to claim 1, wherein when said communication instruction is a message-acquiring instruction, said establishing connection with a second device via the client identification module selected for communication so as to enable communication between said first device and said second device further comprises:
    establishing connection with the client identification module selected for communication;
    establishing connection with the second device, with which a binding relation is created, via the client identification module selected for communication;

acquiring a message in the second device, with which a binding relation is created;
sending said message to said first device.

6. The method according to claim 4, wherein after the step of sending to said second device said to-be-sent message in the format of SMS or MMS as appropriate to said to-be-sent message, said method further comprises: feeding a sending result back to said first device.

7. A communication apparatus, comprising:
one or more processors; and
a memory;
one or more programs, wherein one or more programs are stored in the memory, and when executed by the one or more processors, the one or more programs cause the one or more processors to perform:
establishing connection with a first device;
acquiring communication instructions sent by said first device;
judging whether said communication instruction is a call-establishing instruction; if yes, then, as appropriate to said call-establishing instruction, a client identification module being selected for communication from at least one client identification module in a wireless access equipment; if not, it being judged whether said communication instruction is a message-sending instruction;
if it is judged that said communication instruction is a message-sending instruction, a client identification module being then selected for communication, as appropriate to said message-sending instruction, from said at least one client identification module in said wireless access equipment if it is judged that said communication instruction is not a message-sending instruction, it being then judged whether said communication instruction is a message-acquiring instruction;
if said communication instruction is judged to be a message-acquiring instruction, a client identification module being then selected for communication, as appropriate to said message-acquiring instruction, from said at least one client identification module in said wireless access equipment; and
establishing connection with a second device via the client identification module selected for communication so as to enable communication between said first device and said second device.

8. The apparatus according to claim 7, wherein the one or more processors are further configured to perform: establishing connection with said first device via wireless signal emitted by said wireless access equipment.

9. The apparatus according to claim 7, wherein the one or more processors are further configured to perform:
when said communication instruction is a call-establishing instruction, establishing connection with the client identification module selected for communication;
sending to said first device an instruction for turning on its speaker and microphone;
from the feedback by said first device in response to said instruction for turning on the speaker and the microphone, establishing connection with said second device via the client identification module selected for communication so as to enable calling between said first device and said second device.

10. The apparatus according to claim 7, wherein the one or more processors are further configured to perform:
when said communication instruction is a message-sending instruction, establishing connection with the client identification module selected for communication;
acquiring a to-be-sent message sent by said first device;
sending to said second device said to-be-sent message in the format of SMS or MMS as appropriate to said to-be-sent message.

11. The apparatus according to claim 7, wherein the one or more processors are further configured to perform:
when said communication instruction is a message-acquiring instruction, establishing connection with the client identification module selected for communication;
establishing connection with the second device, with which a binding relation is created, via the client identification module selected for communication;
acquiring a message in the second device, with which a binding relation is created;
sending said message to said first device.

12. The apparatus according to claim 10, wherein the one or more processors are further configured to perform: feeding a sending result back to said first device.

* * * * *